(12) United States Patent
Lu et al.

(10) Patent No.: US 9,746,224 B2
(45) Date of Patent: Aug. 29, 2017

(54) EXPANSION VALVE SETPOINT CONTROL SYSTEMS AND METHODS

(71) Applicant: Liebert Corporation, Columbus, OH (US)

(72) Inventors: Zongtao Lu, Pittsburgh, PA (US); Zhiyong Lin, Dublin, OH (US); Craig Ward, Dublin, OH (US); Benedict J. Dolcich, Westerville, OH (US); John F. Judge, Galena, OH (US)

(73) Assignee: Liebert Corporation, Columbus, OH (US)

( * ) Notice: Subject to any disclaimer, the term of this patent is extended or adjusted under 35 U.S.C. 154(b) by 765 days.

(21) Appl. No.: 14/078,734

(22) Filed: Nov. 13, 2013

(65) Prior Publication Data

US 2014/0137585 A1 May 22, 2014

Related U.S. Application Data

(60) Provisional application No. 61/729,037, filed on Nov. 21, 2012.

(51) Int. Cl.
F25B 49/02 (2006.01)

(52) U.S. Cl.
CPC ........ *F25B 49/02* (2013.01); *F25B 2341/065* (2013.01); *F25B 2400/06* (2013.01); *F25B 2400/075* (2013.01); *F25B 2600/2513* (2013.01); *F25B 2700/1931* (2013.01); *F25B 2700/1933* (2013.01);

(Continued)

(58) Field of Classification Search
CPC ....... F25B 49/02; F25B 2500/19; F25B 49/00
See application file for complete search history.

(56) References Cited

U.S. PATENT DOCUMENTS 5,651,263 A 7/1997 Nonaka et al.
6,318,100 B1 11/2001 Brendel et al.
(Continued)

FOREIGN PATENT DOCUMENTS

CN 1093792 A 10/1994
CN 1321867 A 11/2001
(Continued)

OTHER PUBLICATIONS

First Office Action for Chinese Application No. 201310587153.6 issued on Oct. 24, 2016 with English translation; 19 pages.
U.S. Appl. No. 14/514,466, filed Oct. 15, 2014.

*Primary Examiner* — Ljiljana Ciric
*Assistant Examiner* — Alexis Cox

(57) ABSTRACT

A system includes an error module configured to integrate a difference between a superheat signal and a superheat setpoint to generate an error signal, wherein the superheat signal indicates suction superheat values of a compressor. A comparison module is configured to compare the error signal to a first predetermined threshold to generate a first comparison signal based on the comparison. A zero-crossing module is configured to compare a first count value to a second predetermined threshold to generate a second comparison signal. The first count value is generated based on at least one comparison between the superheat signal and the superheat setpoint. A setpoint module is configured to adjust the superheat setpoint based on the first comparison signal and the second comparison signal.

17 Claims, 5 Drawing Sheets

(52) U.S. Cl.
CPC .............. *F25B 2700/2106* (2013.01); *F25B 2700/21151* (2013.01); *Y02B 30/72* (2013.01)

(56) References Cited

U.S. PATENT DOCUMENTS

| | | | |
|---|---|---|---|
| 6,318,101 | B1 | 11/2001 | Pham et al. |
| 8,539,785 | B2 | 9/2013 | Jiang et al. |
| 8,578,724 | B2 | 11/2013 | Turner et al. |
| 2004/0206102 | A1* | 10/2004 | Homan ............... B60H 1/322 62/228.1 |
| 2005/0198981 | A1* | 9/2005 | Arno ................. F25B 49/025 62/229 |
| 2005/0235660 | A1* | 10/2005 | Pham ................. F04C 28/00 62/126 |
| 2005/0284163 | A1 | 12/2005 | Hwang et al. |
| 2008/0196425 | A1* | 8/2008 | Temple ............... F25B 49/00 62/172 |
| 2009/0228153 | A1 | 9/2009 | Ogawa |
| 2010/0005819 | A1 | 1/2010 | Kawakatsu et al. |
| 2012/0260678 | A1 | 10/2012 | Yoshida |
| 2012/0266623 | A1 | 10/2012 | Patel et al. |
| 2013/0098088 | A1 | 4/2013 | Lin et al. |
| 2013/0160474 | A1 | 6/2013 | Qu et al. |
| 2013/0174591 | A1 | 7/2013 | Das et al. |
| 2014/0137573 | A1* | 5/2014 | Lin ................... F25B 49/02 62/56 |

FOREIGN PATENT DOCUMENTS

| | | |
|---|---|---|
| CN | 1683848 A | 10/2005 |
| CN | 1705852 A | 12/2005 |
| CN | 1959305 A | 5/2007 |
| CN | 101240962 A | 8/2008 |
| CN | 101578490 A | 11/2009 |
| CN | 102102897 A | 6/2011 |
| CN | 102374714 A | 3/2012 |
| CN | 102652245 A | 8/2012 |
| CN | 103216981 A | 7/2013 |
| CN | 103363745 A | 10/2013 |
| JP | 2001147052 A | 5/2001 |
| WO | WO-2013119489 A2 | 8/2013 |

* cited by examiner

EXPANSION VALVE SETPOINT CONTROL SYSTEMS AND METHODS

CROSS-REFERENCE TO RELATED APPLICATIONS

This application claims the benefit of U.S. Provisional Application No. 61/729,037, filed on Nov. 21, 2012. The entire disclosure of the above application is incorporated herein by reference.

FIELD

The present disclosure relates to cooling systems, and more particularly, expansion valve control systems.

BACKGROUND

This section provides background information related to the present disclosure which is not necessarily prior art.

Cooling systems have applicability in a number of different applications where a fluid is to be cooled. The fluid may be a gas, such as air, or a liquid, such as water. Example applications are heating, ventilation, air conditioning (HVAC) systems that are used for cooling spaces where people are present such as offices and data center climate control systems. A data center may refer to a room having a collection of electronic equipment, such as computer servers.

In FIG. 1, an air conditioner 50 that may be used in, for example, a computer room is shown. The air conditioner 50 includes a cooling circuit 51 and a cabinet 52. The cooling circuit 51 is disposed in the cabinet 52 and includes an evaporator 54, an air moving device 56, a compressor 58, a condenser 60, and an expansion valve 62. The evaporator 54, compressor 58, condenser 60 and expansion valve 62 are connected in a closed loop in which a cooling fluid (e.g., phase change refrigerant) circulates. The evaporator 54 may include a V-coil assembly with multiple cooling slabs to provide increased cooling capacity. The evaporator 54 receives the cooling fluid and cools air passing through openings in evaporator 54. The air moving device 56 (e.g., a fan or squirrel cage blower) draws the air from an inlet (not shown) in the cabinet 52 and through the evaporator 54. The cooled air is directed from the evaporator 54 and out a plenum 64 in the cabinet 52.

The compressor 58 circulates the cooling fluid through the condenser 60, the expansion valve 62, the evaporator 54 and back to the compressor 58. The compressor 58 may be, for example, a scroll compressor. A scroll compressor may be a fixed speed, digital, or variable speed compressor. A scroll compressor typically includes two offset spiral disks. The first spiral disk is a stationary disk or scroll. The second spiral disk is an orbiting scroll. The cooling fluid is received at an inlet of the scroll compressor, trapped between the offset spiral disks, compressed, and discharged at a center (or outlet) towards the condenser 60. The condenser 60 may be a micro-channel condenser that cools the cooling fluid received from the compressor 58. The expansion valve 62 may be an electronic expansion valve and expand the cooling fluid out of the condenser 60 from, for example, a liquid to a vapor.

A position of the expansion valve 62 (or opening percentage of the expansion valve) may be adjusted to control a suction superheat value of the compressor 58. The suction superheat value of the compressor is equal to a compressor suction temperature minus a compressor saturated suction temperature. A compressor suction pressure may be used to determine the compressor saturated suction temperature. The compressor suction temperature and the compressor suction pressure may be determined based on signals from corresponding sensors connected between the evaporator 54 and the compressor 58. The superheat value refers to an amount that a temperature of a cooling fluid, in a gas state, is heated above the compressor saturated suction temperature.

The superheat value can be used to modulate (or adjust) position of the expansion valve 62. Position (or opening percentage) control of the expansion valve 62 may be performed by a proportional, integral, derivative (PID) control module. The PID control module controls the superheat value to match a constant predetermined superheat setpoint. This ensures compressor reliability and improves compressor efficiency.

SUMMARY

This section provides a general summary of the disclosure, and is not a comprehensive disclosure of its full scope or all of its features.

In an aspect, a system is provided and includes an error module configured to integrate a difference between a superheat signal and a superheat setpoint to generate an error signal, wherein the superheat signal indicates suction superheat values of a compressor. A comparison module is configured to compare the error signal to a first predetermined threshold to generate a first comparison signal based on the comparison. A zero-crossing module is configured to compare a first count value to a second predetermined threshold to generate a second comparison signal. The first count value is generated based on at least one comparison between the superheat signal and the superheat setpoint. A setpoint module is configured to adjust the superheat setpoint based on the first comparison signal and the second comparison signal.

In another aspect, a system is provided and includes a boundary counter, a boundary module, a setpoint module, and a control module. The boundary counter is configured to increment a first count value when a superheat signal of a compressor exceeds a predetermined limit. The boundary module is configured to compare the first count value to a first predetermined threshold to generate a first comparison signal. The setpoint module is configured to adjust a superheat setpoint based on the first comparison signal. The control module is configured to adjust a position of an expansion valve based on the superheat setpoint.

In another aspect, a system is provided and includes an instability module, a discharge module, and a setpoint module. The instability module is configured to determine whether an unstable suction superheat condition of a compressor exists and generate an instability signal. The discharge module is configured to compare a discharge pressure of the compressor to a predetermined pressure to generate a first comparison signal. The setpoint module is configured to adjust a superheat setpoint based on the instability signal and the first comparison signal.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected implementations and not all possible implementations, and are not intended to limit the scope of the present disclosure.

Corresponding reference numerals indicate corresponding parts throughout the several views of the drawings.

DETAILED DESCRIPTION

Example implementations will now be described more fully with reference to the accompanying drawings.

An air conditioning system may include a condenser (or outdoor coil), an expansion valve, an evaporator (or indoor coil), and a compressor. A position (or opening percentage) of the expansion valve may be adjusted to maintain a superheat value of the compressor at a predetermined superheat setpoint. Due to changes in indoor operating conditions of the air condition system, unstable operation of the air condition system can result.

Indoor operating conditions of the air conditioning system can vary, for example, due to changes in requested temperature and/or dehumidification settings. The operating condition changes, relative sizes of condenser and evaporator volumes, and either too low a charge (less than a first predetermined charge) or too high a charge (greater than a second predetermined charge) of cooling fluid in the evaporator can lead to an unstable operation. A charge of cooling fluid may refer to an amount or a mass of cooling fluid. The superheat value may be maintained in the presence of, for example, a low-charge of cooling fluid in the evaporator to avoid a high-discharge (output) pressure of the compressor. The compressor may cutout when discharge pressure of the compressor is greater than a predetermined pressure. Maintenance of the superheat value in the presence of a low-charge of cooling fluid can lead to a pressure differential across the compressor associated with unstable compressor operation. Unstable compressor operation can result in unstable air condition system operation.

The implementations disclosed below include stabilizing a superheat value of a compressor in various operating conditions. The implementations include managing a cooling fluid charge between an evaporator and a condenser to obtain stable operation. This includes adjusting a superheat setpoint based on certain parameters (e.g., compressor suction pressure, compressor inlet temperature, and compressor discharge pressure). The parameters are dependent on the operating conditions. As a result, the implementations provide dynamic regulation of a superheat setpoint for expansion valve position control. The implementations allow a superheat value of a compressor to be stabilized to an appropriate setpoint, which may be determined in real-time (or during operation of the associated air conditioning system). An unstable superheat condition is detected and superheat setpoint regulation is performed to reset the superheat setpoint from a current setting to rebalance the charge between the evaporator and the condenser, which stabilizes the superheat value and system operation.

Figure 1:
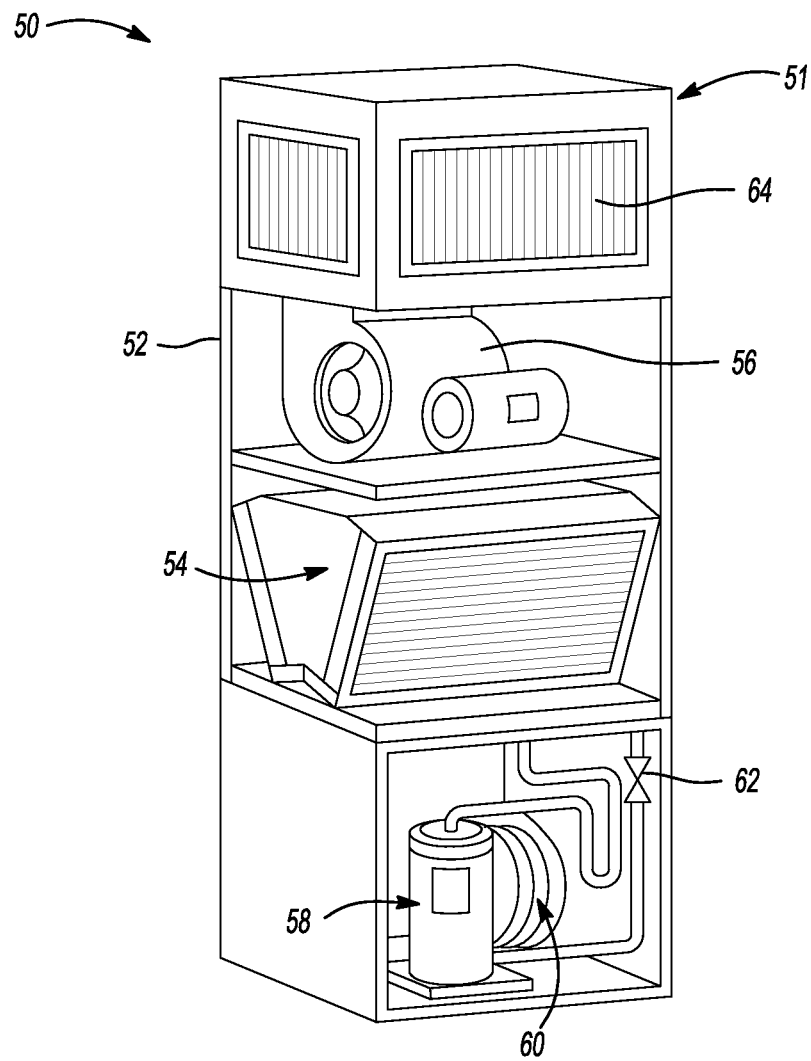
FIG. 1, is a perspective view of a prior art air conditioner.
Figure 2:
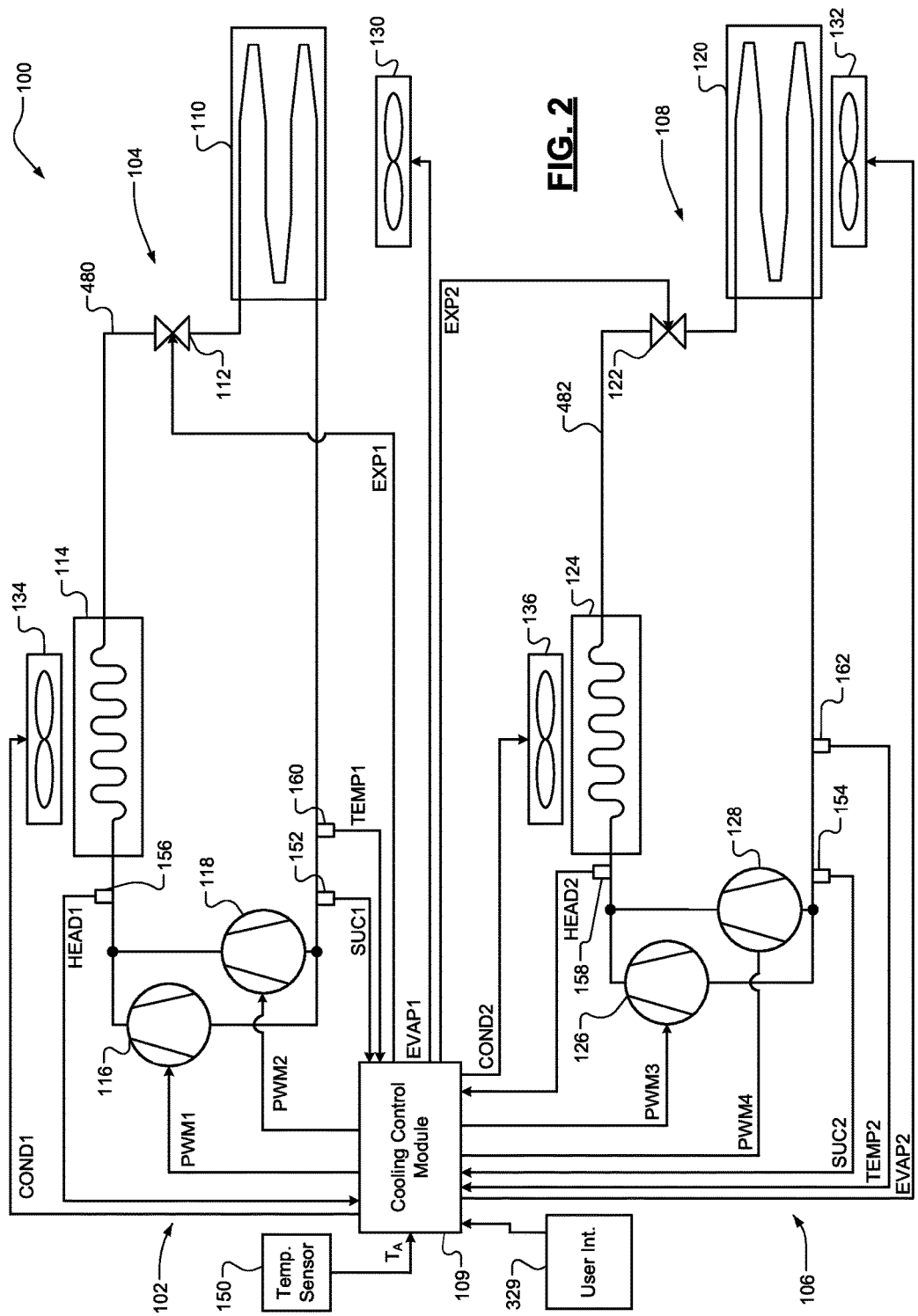
FIG. 2, is a schematic view of a multi-stage cooling system incorporating a cooling control module in accordance with an aspect of the present disclosure.

In FIG. 2, a schematic of a cooling system 100 is shown. The cooling system 100 includes an upstream cooling stage 102 with an upstream (or first) cooling circuit 104 and a downstream (or second) cooling stage 106 with a downstream cooling circuit 108. The cooling circuits 104, 108 are controlled via a cooling control module 109. Although two cooling circuits are shown, a different number of cooling circuits may be included. The upstream cooling circuit 104 includes a first evaporator 110, a first expansion valve 112, a first condenser 114, a first compressor 116, and a second compressor 118. The downstream cooling circuit 108 includes a second evaporator 120, a second expansion valve 122, a second condenser 124, a third compressor 126, and a fourth compressor 128. The evaporators 110, 120 have respective evaporator fans 130, 132. The condensers 114, 124 have respective condenser fans 134, 136.

The cooling control module 109 may generate condenser fan signals COND1. COND2, evaporator fan signals EVAP1, EVAP2, expansion valve signals EXP1, EXP2, and compressor signals PWM1, PWM2, PUMP3, PUMP4 to control the fans 130, 132, 134, 136, expansion valves 112, 122, and the compressors 116, 118, 126, 128.

The cooling control module 109 may control the fans 130, 132, 134, 136, the expansion valves 112, 122, and/or the compressors 116, 118, 126, 128 based on signals from various sensors. The sensors may include, for example, an ambient temperature sensor 150, suction pressure sensors 152, 154, head pressure sensors 156, 158 and/or compressor inlet (or evaporator outlet) temperature sensors 160, 162. The ambient temperature sensor 150 may be an outdoor ambient temperature sensor and generate an ambient temperature signal $T_A$. The suction pressure sensors 152, 154 generate suction pressure signals SUC1, SUC2 and detect pressures of fluid received by the compressors 116, 118, 126, 128. The head pressure sensors 156, 158 generate head pressure (or discharge pressure) signals HEAD1, HEAD2 and detect pressures of fluid out of the compressors 116, 118, 126, 128. The temperature sensors 160, 162 detect temperatures of fluids (i) downstream from the evaporators 110, 120, and (ii) between the evaporators 110, 120 and the compressors 116, 118, 126, 128.

The evaporators 110, 120 may be micro-channel (MC) cooling coil assemblies and/or includes a MC heat exchanger and/or may be fin-and-tube cooling coil assemblies. The expansion valves 112, 122 may be mechanical and/or electronic based expansion valves (e.g., EEVs) and/or thermostatic expansion valves. Each of the condensers 114, 124 may be of a variety of types, such as an air-cooled condenser, a water-cooled condenser, or glycol cooled condenser. The condensers 114, 124 may include heat rejection devices that transfer heat from return fluids to a cooler medium, such as outside air. The heat rejection devices may include air or liquid cooled heat exchangers.

In each of the circuits 104, 108, a cooling fluid (or refrigerant) is circulated by a respective pair of the compressors 116, 118, 126, 128. The fluids flow from the compressors 116, 118, 126, 128, through the condensers 114, 124, expansion valves 112, 122, and evaporators 110, 120 and back to the compressors 116, 118, 126, 128. The evaporators 110, 120 may be arranged in stages such that air flows in a serial fashion first through the upstream evaporator 110 and then through the downstream evaporator 120. By having multiple cooling stages arranged for serial air flow, a temperature differential across the evaporators 110, 120 is reduced. This in turn allows the evaporators 110, 120 to operate at different pressure levels and allows the pressure differences between the respective evaporators 110, 120 and condensers 114, 124 to be reduced.

Since compressor power is a function of a pressure difference between an evaporator and a condenser, a lower pressure difference is more energy efficient. Each of the cooling circuits 104, 108 may include a pair of tandem compressors (e.g., compressors 116, 118 or compressors 126, 128). Each of the tandem compressors may be a fixed capacity scroll compressor (e.g., compressors 116, 126) or a variable capacity scroll compressor (e.g., compressors 118, 128). The fixed capacity scroll compressors may be activated (powered ON) and deactivated (powered OFF) based on control signals generated by the cooling control module 109. The variable capacity scroll compressors may be controlled via a respective digital signal received from the cooling control module 109.

Each of the cooling circuits 104, 108 may include a tandem set of compressors. Each of the tandem sets may include two compressors of equal volumetric displacement. The first compressor may be a digital pulse width modulation (PWM) scroll compressor that receives a PWM percentage signal to control speed and capacity of the first compressor. The second compressor may be a fixed speed scroll compressor with simply ON/OFF capacity control. Suction and discharge lines of these two compressors may be piped in parallel to form the tandem set. As an example, compressors 116, 126 may be PWM scroll compressors and compressors 118, 128 may be fixed speed scroll compressors. The fixed speed scroll compressors may receive ON/OFF control signals rather than PWM signals from the cooling control module 109.

The tandem set compressor configuration allows for energy efficient temperature control by providing a wide range of capacity modulation for a cooling circuit of an air conditioning system. The tandem sets offer an energy efficient configuration at compressor startup by allowing the digital PWM scroll compressors to be activated prior to the fixed speed scroll compressors. This effectively allows the tandem sets to provide partial-displacement operation with a reduced volumetric displacement/capacity until additional capacity is needed from the fixed scroll compressors.

As used herein, a compressor pressure differential refers to a difference between input and output pressures of the compressor. A low-pressure differential (less than a predetermined differential and/or suction and head pressures of the compressor are equal to each other) can cause an unloaded compressor condition. Compressor unloading can lead to reduced cooling capacity of the compressors of a tandem set at startup and potential damage to the tandem set and/or associated compressor motors. Unloading of the compressors reduces the ability of the tandem set to move vapor, which reduces cooling capacity. This reduction in the pressure differential can also cause damage to compressor motor(s) if the reduction occurs repeatedly.

Figure 3:
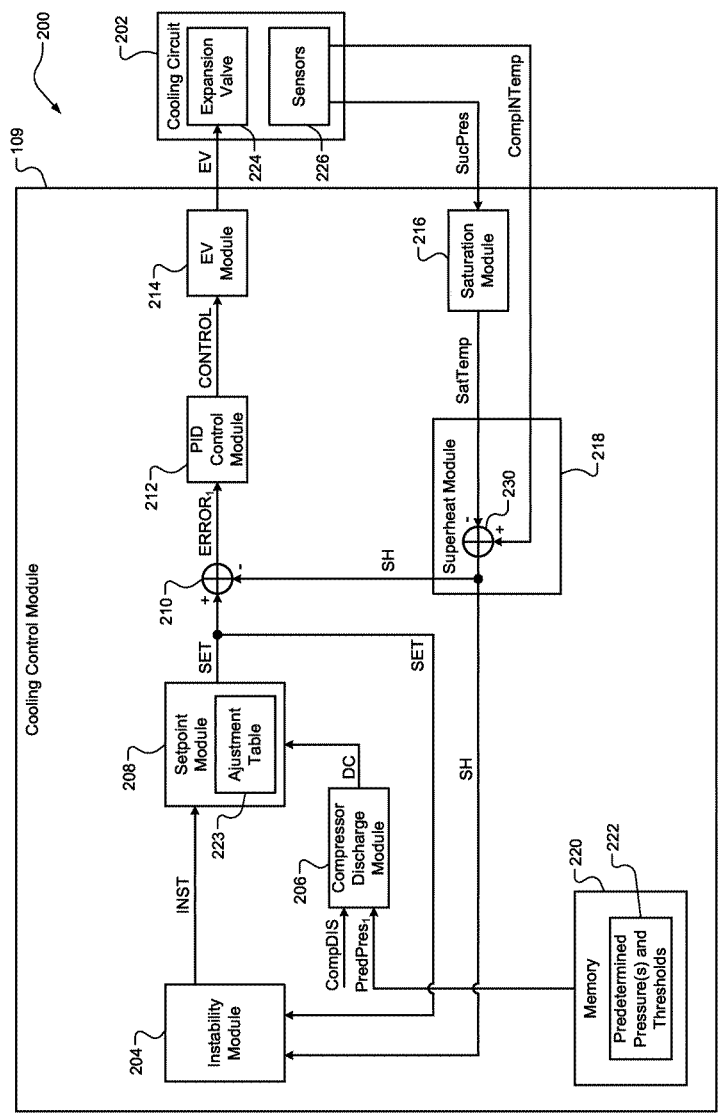
FIG. 3, is a functional block diagram of a superheat setpoint regulation system in accordance with an aspect of the present disclosure.

Referring also to FIG. 3, a functional block diagram of a superheat setpoint regulation system 200 is shown. The superheat setpoint regulation system 200 includes the cooling control module 109 and a cooling circuit 202 (e.g., one of the cooling circuits 104, 108 of FIG. 2). The cooling control module 109 includes an instability module 204, a compressor discharge module 206, a setpoint module 208, a summer 210, a PID control module 212, an expansion valve (EV) module 214, a superheat module 216 and a saturation module 218. The instability module 204 determines whether an unstable superheat condition exists based on a superheat setpoint SET and a superheat signal SH, which includes a superheat value. The instability module 204 generates an instability signal INST indicating whether an unstable condition exists. The instability signal may be a digital signal. Determination of an unstable superheat condition is further described below with respect to FIGS. 4 and 5. The super heat value indicates a superheat condition of a compressor (e.g., one of the compressors 116, 118, 126, 128) of the cooling circuit 202.

The compressor discharge module 206 determines whether a discharge pressure of the compressor has exceeded a first predetermined pressure $PredPres_1$. The compressor discharge module 206 may compare a discharge signal CompDIS received from a discharge sensor (e.g., one of the sensors 152, 158) and generate a discharge comparison signal DC. The predetermined pressure $PredPres_1$ may be accessed from a memory 220, which stores predetermined pressure(s) and thresholds 222.

The setpoint module 208 generates the superheat setpoint signal SET based on the instability signal INST and the discharge signal DC. The setpoint module 208 may generate the superheat setpoint signal SET based on, for example, an adjustment table 223. An example of an adjustment table is provided as Table 1.

TABLE 1

Adjustment Table

| Unstable Condition Detected | High Discharge Pressure (CompDIS > PredPres) | Superheat Setpoint Change |
|---|---|---|
| 1 (TRUE) | 0 (FALSE) | 1 (Increase Setpoint) |
| 0 (FALSE) | 0 (FALSE) | 0 (No Change) |
| 0 (FALSE) | 1 (TRUE) | −1 (Decrease Setpoint) |
| 1 (TRUE) | 1 (TRUE) | −1 (Decrease Setpoint) |

The summer 210 subtracts the superheat signal SH from the superheat setpoint SET to generate an error signal $ERROR_1$. The PID control module 212 provides PID control of a position of an EV 224 (e.g., one of the EVs 112, 122) of the cooling circuit 202. The PID control module 212 generates a control signal CONTROL to control the position of the EV 224 based on the error signal $ERROR_1$. The PID control module 212 may have tuning parameters such as PID gains, which may be used to determine PID values for EV control. The EV control module 214 generates an EV signal to adjust the position of the EV 224 based on the control signal CONTROL.

The superheat module 218 receives sensor signals from sensors 226 (e.g., sensors 154, 156, 160, 162) of the cooling circuit 202 and/or a saturation temperature SatTemp from the saturation module 216. The sensor signals may include a suction pressure signal SucPres and compressor inlet temperature signal CompINTemp. The saturation module 216 determines the saturation temperature SatTemp of the compressor based on the suction pressure signal SucPres. The superheat module 218 may include a second summer 230, which may subtract the saturation temperature SatTemp from the compressor inlet temperature CompINTemp to generate the superheat signal SH.

Figure 4:
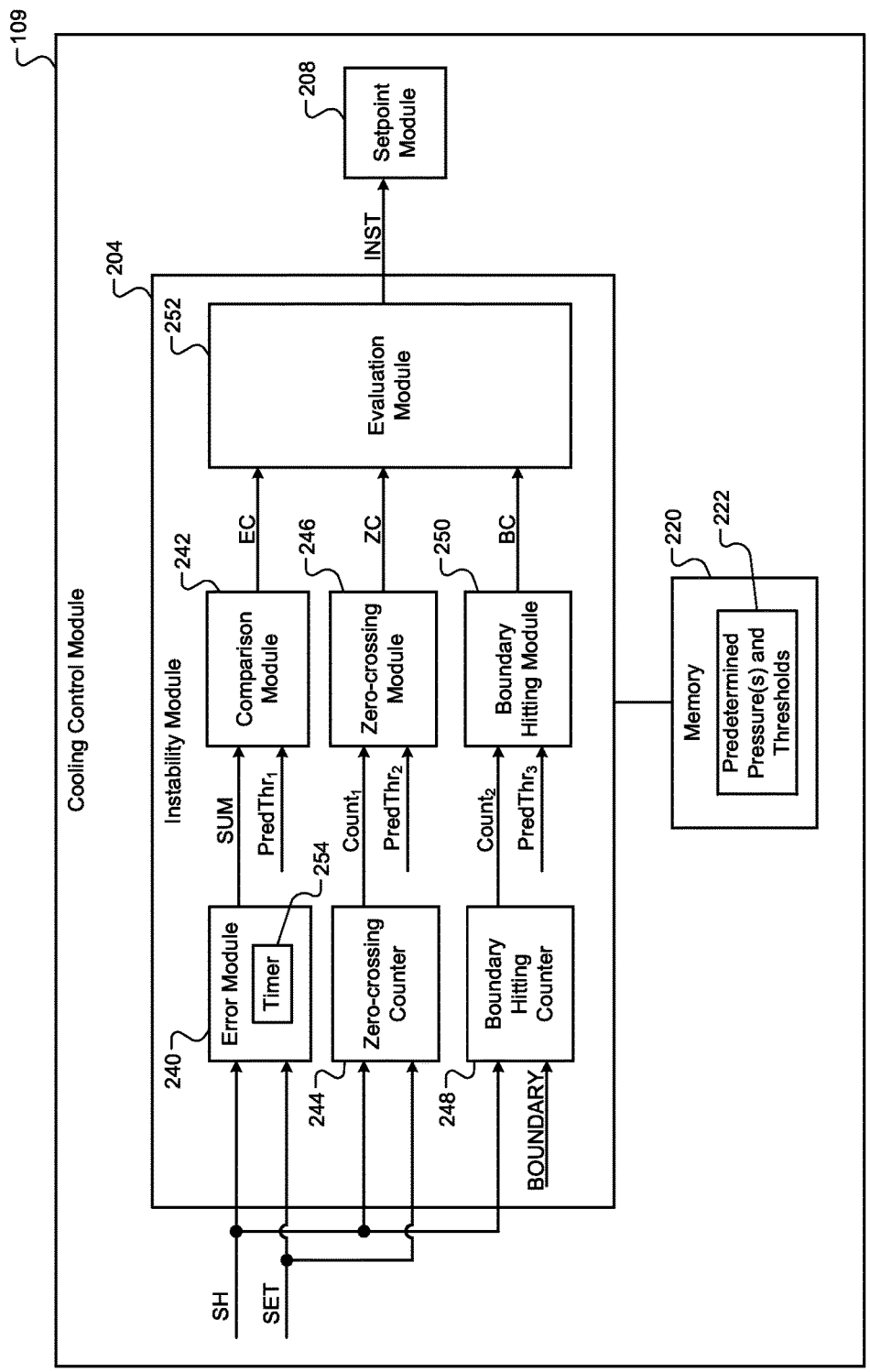
FIG. 4, is a functional block diagram of a portion of the cooling control module of FIG. 2 incorporating an instability module in accordance with an aspect of the present disclosure.

Referring also to FIG. 4, a functional block diagram of a portion of the cooling control module 109 is shown. The cooling control module 109 includes the instability module 204, the setpoint module 208 and the memory 220. The instability module 204 distinguishes unstable behaviors from stable behaviors. Unstable signals can present periodic oscillations with amplitudes greater than predetermined thresholds and/or setpoints. The instability module 204 includes an error module 240, a comparison module 242, a zero-crossing counter 244, a zero-crossing module 246, a boundary hitting counter 248, a boundary hitting module 250, and an evaluation module 252.

The error module 240 receives the superheat signal SH and the superheat setpoint signal SET and may generate a second error signal $ERROR_2$. The second error signal $ERROR_2$ is generated based on a difference between the superheat signal SH and the setpoint signal SET. The error signal may be, for example, a sinusoidal signal. The difference between the superheat signal SH and the setpoint signal SET (or the first error signal $ERROR_1$) may be integrated over time and normalized based on a moving window, as further described below.

To detect an unstable superheat condition, the error module 240 may integrate an absolute value of the first error signal $ERROR_1$ over time based on the moving window to generate the second error signal $ERROR_2$. The moving window may be used to limit the amount of data history integrated to provide the second error signal $ERROR_2$. The moving window may include a predetermined number of sinusoidal periods of the first error signal $ERROR_1$. The integration may be determined using, for example, equation 1, where t is time and WindowSize is the size of the moving window.

$$ERROR_2 = \int^t_{t-WindowSize} |SET - SuperHeat| dt \quad (1)$$

The moving window may have a predetermined size, which may be stored in the memory 220 and accessed by the error module 240. The second error signal $ERROR_2$ may be equal to the amplitude A multiplied by the WindowSize and further multiplied by $2/\pi$. To provide the moving window and perform the integration of the first error signal $ERROR_1$, the error module 240 may include a timer 254 that is incremented to a value equal to the size of the window WindowSize.

The second error signal $ERROR_2$ may be normalized against a baseline. The baseline may include the size of the moving window and a predetermined oscillation amplitude A. The predetermined oscillation amplitude A refers to amplitudes of peak and valleys of a sinusoidal period of a sinusoidal baseline signal. The predetermined oscillation amplitude A is determined to be a maximum amplitude for stable oscillation and system operation. When the first error signal $ERROR_1$ has an amplitude that is greater than the predetermined amplitude A and/or the second error signal $ERROR_2$ is greater than a predetermined threshold, an unstable condition may exist.

The comparison module 242 compares the second error signal $ERROR_2$ to a first predetermined threshold $PredThr_1$ and generates an error comparison signal EC. The error comparison signal EC indicates whether the second error signal $ERROR_2$ is greater than the first predetermined threshold $PredThr_1$.

The zero-crossing counter 244 receives the superheat signal SH and the superheat setpoint signal SET and increments a first count value $Count_1$ when the superheat signal SH is equal to the superheat setpoint signal SET. The zero-crossing module 246 determines whether the first count value $Count_1$ is greater than a second predetermined threshold $PredThr_2$. The zero-crossing module 246 generates a zero-crossing comparison signal ZC to indicate when the first count value $Count_1$ is greater than the second predetermined threshold $PredThr_2$. The second predetermined threshold $PredThr_2$ may be normalized against a second baseline that is determined by the moving window size WindowSize and the oscillation periods. The second predetermined threshold $PredThr_2$ may be set equal to, for example, 1 or a value within a predetermined range of 1.

The boundary hitting counter 248 receives the superheat signal SH and compares the superheat signal SH to a predetermined range limits and/or predetermined value(s) BOUNDARY (referred to hereinafter as boundary value(s) BOUNDARY). The boundary hitting counter 248 increments a second count value $Count_2$ when the superheat signal SH is greater than the predetermined value(s) BOUNDARY. The boundary hitting module 250 compares the second count value $Count_2$ to a third predetermined threshold $PredThr_3$ and generates a boundary comparison signal BC. The boundary hitting module 250 generates the boundary comparison signal BC to indicate when the second count value $Count_2$ is greater than the third predetermined threshold $PredThr_3$. The third predetermined threshold $PredThr_3$ may be normalized against a third baseline that is determined by the moving window size WindowSize and the oscillation periods. The third predetermined threshold $PredThr_3$ may be set equal to 1 or a value within a predetermined range of 1.

The modules 240-252 are used to eliminate false positives and false negatives of whether an unstable superheat condition exists. By normalizing and integrating the error signal, normalizing and determining a number of zero-crossings, and by normalizing and determining a number of times a superheat has exceeded a predetermined boundary, reporting of an unstable condition via the evaluation module 252 is prevented.

The evaluation module 252 generates the instability signal INST based on the comparison signals EC, ZC, BC. The instability signal INST may indicate that an unstable condition exists when, for example, EC and ZC are both TRUE. Indication by the instability signal INST that an unstable condition exists triggers an increase or a decrease in the superheat setpoint signal SET (or superheat setpoint). The change in the superheat setpoint signal SET may be based on the comparison signals EC, ZC, BC. Operation of the superheat setpoint regulation system 200 and the instability module 204 of FIGS. 3 and 4 are further described with respect to the method of FIG. 5.

Figure 5:
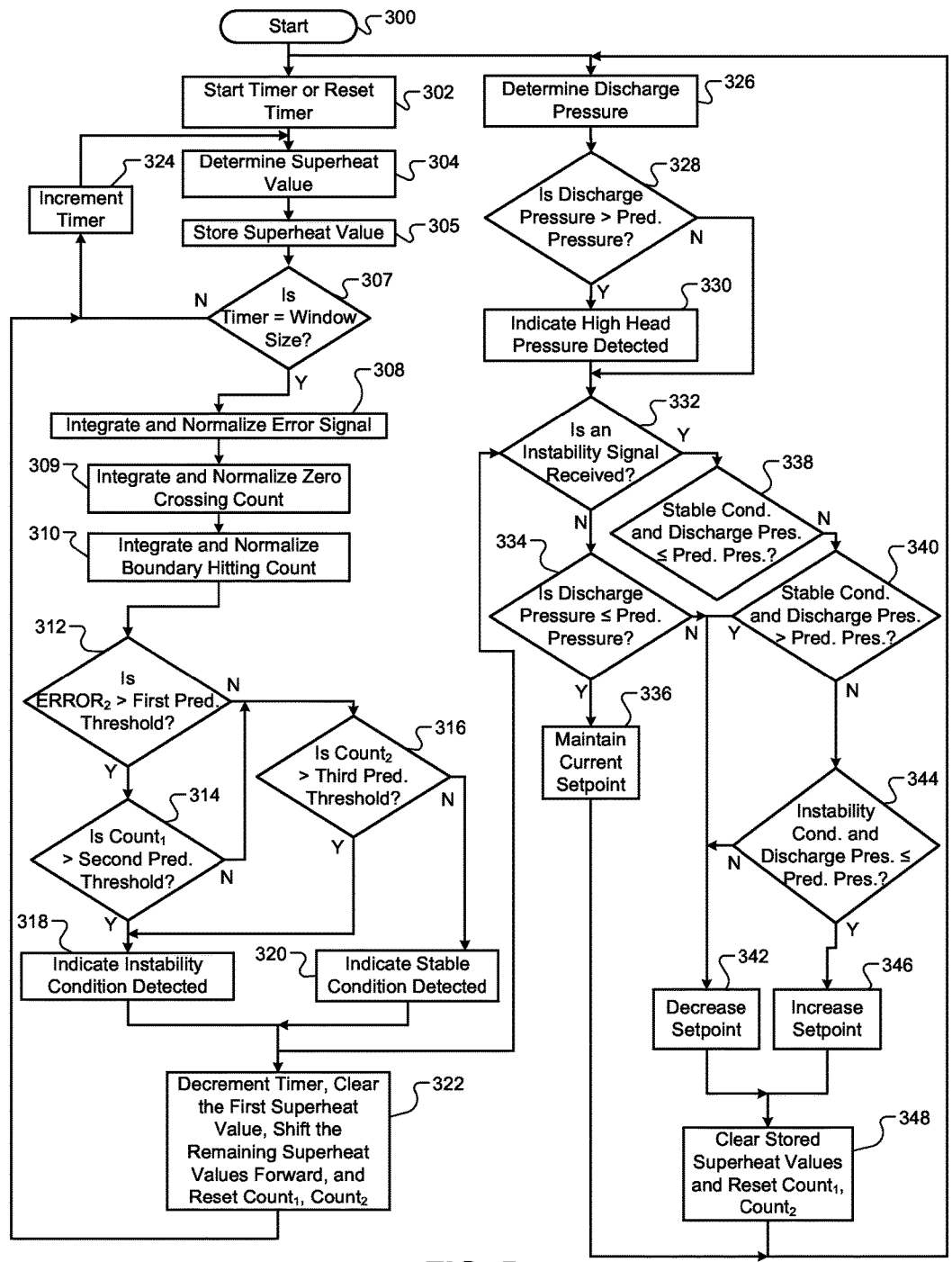
FIG. 5, is a logic flow diagram illustrating a superheat setpoint regulation method in accordance with an aspect of the present disclosure.

The superheat setpoint regulation system 200 may be operated using numerous methods, an example method is provided by the method of FIG. 5. In FIG. 5, a logic flow diagram illustrating a superheat setpoint regulation method is shown. The method may begin at 300. Although the following tasks are primarily described with respect to the implementations of FIGS. 2-4, the tasks may be easily modified to apply to other implementations of the present disclosure. The tasks may be iteratively performed.

At 302, the timer 254 may be started or reset. The timer 254 may be started initially and/or after each time tasks 332-346 are performed be reset.

At 304, the error module 240 determines a superheat value based on the superheat signal SH. At 305, the superheat value for a current timestamp, as indicated by the timer, is stored in the memory 220.

At 307, the instability module 204 determines whether the timer 254 is equal to the WindowSize. Task 308 is performed when the timer 254 is equal to the WindowSize, otherwise task 324 is performed.

At 308, the error module 240 generates an error signal (e.g., the first error signal $ERROR_1$) based on the superheat values stored during tasks 304-307 and a superheat setpoint. Values of the first error signal $ERROR_1$ may be generated by determining differences between each of the superheat values and the superheat setpoint. The error signal is integrated and normalized over the moving window as described above to generate the second error signal $ERROR_2$.

At 309, the zero-crossing (or first) count $Count_1$ is calculated and normalized across the moving window, as described above. At 310, the boundary count (or second) count $Count_2$ is calculated and normalized, as described above.

At 312, the comparison module 242 determines whether the second error signal $ERROR_2$ is greater than the first predetermined threshold $PredThr_1$ and generates the error (or first) comparison signal EC. Task 314 may be performed when the second error signal $ERROR_2$ is greater than the first predetermined threshold $PredThr_1$, otherwise task 316 may be performed.

At 314, the zero-crossing module 246 determines whether the first count $Count_1$ is greater than the second predetermined threshold $PredThr_2$ and generates the zero-crossing (or second) comparison signal ZC. This comparison is performed when at steady state to prevent the integration of the first error signal $ERROR_1$ from "winding up". The zero-crossing counter 240 is used as a second detection criterion to count a number of times the superheat signal SH crosses the superheat setpoint. If the first count $Count_1$ is greater than the second predetermined threshold $PredThr_2$, task 318 is performed, otherwise task 316 is performed.

At 316, the boundary hitting module 250 determines whether the second count $Count_2$ is greater than the third predetermined threshold $PredThr_3$ and generates the boundary comparison signal BC. If the second count $Count_2$ is greater than the third predetermined threshold $PredThr_3$, task 318 is performed, otherwise task 320 is performed.

At 318, the evaluation module 252 may indicate that an unstable superheat condition exists based on the comparison signals EC, ZC, BC. This may be indicated via the instability signal INST. An unstable condition exists when task 314 or task 326 is TRUE. At 320, the evaluation module 252 may indicate that a stable superheat condition exists based on the comparison signals EC, ZC, BC. This may be indicated via the instability signal INST. A stable condition exists when task 316 is FALSE. Tasks 322 and 332 are performed subsequent to tasks 318 and 320.

At 322, the timer is decremented, the first superheat value associated with a first timestamp of the moving window is dropped and/or deleted, the remaining superheat values are shifted forward, and the counts $Count_1$, $Count_2$ are reset. This allows for an updated superheat value to be determined during a subsequent iteration of task 304. During a subsequent iteration of tasks 304-305, the updated superheat value is determined and stored as a last superheat value in the memory 220. The latest stored superheat values are then used when performing a subsequent iteration of task 308. Tasks 304, 305, 307, 322, and 324 provide the moving window, which is used to store a latest predetermined number of superheat values.

As an example, during tasks 304-307 and 324, a predetermined number of superheat values as dictated by the size of the moving window may be stored at addresses of the memory 220 beginning at a first address and ending at a last address. When the remaining superheat values are shifted forward, a first pointer associated with a first time stamp of the moving window may be shifted from the first address (associated with the dropped superheat value) to the second address. A second superheat value was previously stored at the second address. A last pointer associated with the last timestamp of the moving window and previously pointing to the last address (associated with the last previously stored superheat value) may be shifted to an address subsequent the last address or to the first address. This shifts each of the superheat values and allows for the updated superheat value to be stored at the subsequent address or to overwrite the first superheat value at the first address.

Task 324 is performed subsequent to task 322. At 324, the timer is incremented. The timer 254 may be incremented for each iteration of tasks 304-307.

The following tasks 326-330 may be performed in parallel with tasks 302-324. At 326, the boundary hitting counter 248 determines the discharge pressure of a compressor (e.g., one of the compressors, 116, 118, 126, 128). At 328, the boundary hitting counter 248 determines whether the discharge pressure CompDIS is greater than the predetermined pressure $PredPres_2$. Task 330 is performed when the discharge pressure CompDIS is greater than the predetermined pressure $PredPres_2$, otherwise task 332 is performed.

At 330, the boundary hitting counter 248 may indicate that the discharge pressure (or head pressure) is a high-discharge pressure. This may be done by setting, for example, a high discharge flag in the memory 220.

At 332, the setpoint module 208 determines whether the instability signal INST has been generated. Completion of tasks 326-330 may occur prior to completion of tasks 302-324. Task 332 allows the superheat setpoint SET to be adjusted when (i) the discharge pressure CompDIS is not less than or equal to the second predetermined pressure $PredPres_2$, and (ii) tasks 326-330 are completed prior to tasks 302-324. Task 334 is performed when the instability signal INST has not been generated and/or received by the setpoint module 208, otherwise task 338 is performed.

At 334, the setpoint module 208 may determine whether the discharge pressure CompDIS is less than or equal to the second predetermined pressure $PredPres_2$. Task 336 is performed when the discharge pressure CompDIS is less than or equal to the second predetermined pressure $PredPres_2$, otherwise task 342 is performed. At 336, the setpoint module 208 may maintain (or refrain from changing) the superheat setpoint SET.

At 338, the setpoint module 208 determines whether a stable condition exists based on results of tasks 312-316 and whether the discharge pressure CompDIS is less than or equal to the second predetermined pressure $PredPres_2$. If a stable condition exists and the discharge pressure CompDIS is less than or equal to the second predetermined pressure $PredPres_2$, then task 336 is performed, otherwise task 340 is performed.

At 340, the setpoint module 208 determines whether a stable condition exists based on results of tasks 312-316 and whether the discharge pressure CompDIS is greater than the second predetermined pressure $PredPres_2$. If TRUE, task 342 is performed, otherwise task 344 is performed.

At 342, the setpoint module 208 may decrease the superheat setpoint SET. The setpoint module 208 may determine an amount to decrease the superheat setpoint SET. The amount of decrease may be based on the second error signal $ERROR_2$, the discharge pressure CompDIS, the counter values $Count_1$, $Count_2$, results of tasks 312, 314, 316 and/or 318, the instability signal INST, and/or other suitable parameters and/or information. The setpoint module 208 may then decrease the superheat setpoint SET accordingly.

At 344, the setpoint module 208 determines whether an unstable condition exists based on results of tasks 312-316 and whether the discharge pressure CompDIS is less than or equal to the second predetermined pressure $PredPres_2$. If TRUE task 346 is performed, otherwise task 342 is performed.

At 346, the setpoint module 208 may increase the superheat setpoint SET. The setpoint module 208 may determine an amount to increase the superheat setpoint SET. The amount of increase may be based on the second error signal $ERROR_2$, the discharge pressure CompDIS, the counter values $Count_1$, $Count_2$, results of tasks 312, 314, 316 and/or 318, the instability signal INST, and/or other suitable parameters and/or information. The setpoint module 208 may then increase the superheat setpoint SET accordingly.

At 348, the instability module clears the superheat data stored in the memory and resets the count values $Count_1$, $Count_2$. Clearing the superheat data includes deleting the superheat values stored during tasks 304, 305. Task 302 may be performed subsequent to task 348.

Setpoint management provided by the above tasks is used to regulate the superheat setpoint SET such that a superheat condition of a compressor is stabilized for an updated superheat setpoint SET. This improves system operation robustness and reliability.

The above-described tasks are meant to be illustrative examples; the tasks may be performed sequentially, synchronously, simultaneously, continuously, during overlapping time periods or in a different order depending upon the application. Also, any of the tasks may not be performed or skipped depending on the implementation and/or sequence of events.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, methods, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Although the terms first, second, third, etc. may be used herein to describe various elements, components and/or modules, these items should not be limited by these terms. These terms may be only used to distinguish one item from another item. Terms such as "first," "second," and other numerical terms when used herein do not imply a sequence or order unless clearly indicated by the context. Thus, a first item discussed herein could be termed a second item without departing from the teachings of the example implementations.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system comprising:
an error module configured to receive a superheat signal from a superheat module and integrate over time the difference between the superheat signal and a superheat setpoint value to generate an error signal, wherein the superheat signal indicates suction superheat values of a compressor;
a comparison module configured to compare the error signal to a first predetermined threshold to generate a first comparison signal based on the comparison;
a zero-crossing module configured to compare a first count value to a second predetermined threshold to generate a second comparison signal, wherein the first count value is generated based on at least one comparison between the superheat signal and the superheat setpoint value;
a setpoint module configured to adjust the superheat setpoint based on the first comparison signal and the second comparison signal; and
a control module configured to adjust the position of an expansion valve based on the superheat setpoint.

2. The system of claim 1, wherein the setpoint module is configured to:
adjust the superheat setpoint in response to the error signal being greater than the first predetermined threshold; and
one of decrease or refrain from adjusting the superheat setpoint in response to the error signal being less than or equal to the first predetermined threshold.

3. The system of claim 1, wherein the setpoint module is configured to:

adjust the superheat setpoint in response to the first count value being greater than the second predetermined threshold; and one of decrease or refrain from adjusting the superheat setpoint in response to the first count value being less than or equal to the second predetermined threshold.

4. The system of claim 1, wherein the setpoint module is configured to adjust the superheat setpoint in response to (i) the error signal being greater than the first predetermined threshold, and (ii) the first count value being greater than the second predetermined threshold.

5. The system of claim 1, further comprising:
a counter configured to generate a second count value indicative of the number of times the superheat signal has been greater than one or more predetermined values; and
a boundary module configured to compare the second count value to a third predetermined value to generate a third comparison signal,
wherein the setpoint module is configured to adjust the superheat setpoint based on the third comparison signal.

6. The system of claim 1, further comprising a discharge module configured to compare the discharge pressure of the compressor to a predetermined pressure to generate a discharge comparison signal,
wherein the setpoint module is configured to adjust the superheat setpoint based on the discharge comparison signal.

7. The system of claim 6, wherein the setpoint module is configured to:
increase the superheat setpoint when (i) the error signal is greater than the first predetermined threshold, and (ii) the first count value is greater than the second predetermined threshold;
decrease the superheat setpoint when (i) the error signal is less than or equal to the first predetermined threshold, (ii) the first count value is less than or equal to the second predetermined threshold, or (iii) the discharge pressure is greater than the predetermined pressure; and
refrain from adjusting the superheat setpoint when (i) the error signal is less than or equal to the first predetermined threshold, (ii) the first count value is less than or equal to the second predetermined threshold, or (iii) the discharge pressure is less than or equal to the predetermined pressure.

8. The system of claim 6, wherein the setpoint module is configured to:
Increase or maintain the superheat setpoint in response to the discharge pressure being less than or equal to the predetermined pressure; and
decrease the superheat setpoint when the discharge pressure is greater than the predetermined pressure.

9. The system of claim 6, further comprising an instability module configured to determine an instability state of the compressor and generate an instability signal based on the first comparison signal, the second comparison signal, and the discharge comparison signal, wherein:
the setpoint module is configured to one of decrease or refrain from adjusting the superheat setpoint based on at least one of the instability module generating the instability signal and the setpoint module receiving the instability signal from the instability module, and
the instability signal indicates the instability state of the compressor.

10. The system of claim 9, wherein the instability module is configured to generate the instability signal to indicate an instability condition exists with the compressor if (i) the error signal is greater than the first predetermined threshold, and (ii) the first count value is greater than the second predetermined threshold.

11. The system of claim 10, further comprising a boundary module configured to compare a second count value to a third predetermined threshold to generate a third comparison signal, wherein:
the second count value is indicative of the number of times the superheat signal has been greater than one or more predetermined values;
the setpoint module is configured to adjust the superheat setpoint based on the third comparison signal; and
the instability module is configured to generate the instability signal to indicate an instability condition does not exist with the compressor if (i) the error signal is less than or equal to the first predetermined threshold, and (ii) the second count value is greater than the third predetermined threshold.

12. The system of claim 6, further comprising:
a boundary counter configured to increment a second count value when the superheat signal exceeds a predetermined limit; and
a boundary circuit configured to compare the second count value to a third predetermined threshold to generate a third comparison signal,
wherein the setpoint module is configured to adjust the superheat setpoint based on the third comparison signal.

13. The system of claim 1, further comprising:
a saturation module configured to determine a saturation temperature of the compressor based on a suction pressure of the compressor; and
the superheat module is configured to generate the superheat signal based on the saturation temperature and an inlet temperature of the compressor.

14. The system of claim 1, further comprising the compressor.

15. The system of claim 1, wherein the setpoint module is configured to increase the superheat setpoint in response to (i) the error signal being greater than the first predetermined threshold, and (ii) the first count value being greater than the second predetermined threshold.

16. The system of claim 1, further comprising the superheat module.

17. A system comprising:
a processor; and
a memory configured to store software including instructions, which are executable by the processor and are configured to:
generate a superheat signal,
integrate over time the difference between the superheat signal and a superheat setpoint value to generate an error signal, wherein the superheat signal indicates a suction superheat value of a compressor,
compare the error signal to a first predetermined threshold to generate a first comparison signal based on the comparison,
compare a first count value to a second predetermined threshold to generate a second predetermined threshold to generate a second comparison signal, wherein the first count value is generated based on at least one comparison between the superheat signal and the superheat setpoint value,
adjust the superheat setpoint based on the first comparison signal and the second comparison signal, and adjust the position of an expansion valve based on the superheat setpoint value.

\* \* \* \* \*